United States Patent
Mirbagheri et al.

(10) Patent No.: US 9,490,935 B2
(45) Date of Patent: Nov. 8, 2016

(54) BLIND SEARCH FOR NETWORK POSITIONING REFERENCE SIGNAL (PRS) CONFIGURATION PARAMETERS

(71) Applicant: QUALCOMM Incorporated, San Diego, CA (US)

(72) Inventors: Arash Mirbagheri, San Diego, CA (US); Guttorm Ringstad Opshaug, Redwood City, CA (US); Benjamin Alfred Werner, San Carlos, CA (US); Borislav Ristic, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 118 days.

(21) Appl. No.: 14/221,140

(22) Filed: Mar. 20, 2014

(65) Prior Publication Data

US 2015/0071092 A1    Mar. 12, 2015

Related U.S. Application Data

(60) Provisional application No. 61/874,985, filed on Sep. 7, 2013.

(51) Int. Cl.
| | |
|---|---|
| H04J 1/16 | (2006.01) |
| H04L 1/00 | (2006.01) |
| H04W 64/00 | (2009.01) |
| G01S 5/02 | (2010.01) |
| H04L 27/26 | (2006.01) |

(52) U.S. Cl.
CPC ........... *H04L 1/0038* (2013.01); *G01S 5/0221* (2013.01); *H04L 1/0039* (2013.01); *H04W 64/00* (2013.01); *H04L 27/261* (2013.01)

(58) Field of Classification Search
CPC ...... H04L 1/00; H04L 1/0038; H04L 27/261
See application file for complete search history.

(56) References Cited

U.S. PATENT DOCUMENTS

| | | | |
|---|---|---|---|
| 8,401,111 B2 | 3/2013 | Sampath et al. | |
| 2011/0081933 A1* | 4/2011 | Suh et al. | ..................... 455/509 |
| 2011/0158200 A1 | 6/2011 | Bachu et al. | |
| 2011/0176499 A1 | 7/2011 | Siomina et al. | |
| 2011/0205914 A1* | 8/2011 | Krishnamurthy et al. | ... 370/252 |
| 2013/0023285 A1 | 1/2013 | Markhovsky et al. | |
| 2013/0077469 A1 | 3/2013 | Ma et al. | |

FOREIGN PATENT DOCUMENTS

WO    2014112916 A1    7/2014

OTHER PUBLICATIONS

International Search Report and Written Opinion—PCT/US2014/054140—ISA/EPO—Mar. 5, 2015.
Motorola: "Link Results for RSTD Accuracy," 3GPP Draft; R4-100510, 3rd Generation Partnership Project (3GPP), Mobile Competence Centre, 650, Route Des Lucioles, F-06921 Sophia-Antipolis Cedex, France, vol. RAN WG4, no. San Francisco, USA; Feb. 22, 2010, Mar. 1, 2010, XP050426259, pp. 1-10.

* cited by examiner

*Primary Examiner* — Kan Yuen
(74) *Attorney, Agent, or Firm* — Seyfarth Shaw LLP

(57) ABSTRACT

A method for blindly determining positioning reference signals in a wireless communication network determines a positioning reference signal (PRS) network configuration by estimating a PRS energy from predetermined locations of each subframe of an incoming signal. Such a method may also include blindly detecting PRS parameters based on the estimated PRS energy. The PRS energy may be peak energy responses for deep searches or verifications. The PRS energy may be a signal to signal plus noise ratio for shallow searches.

16 Claims, 12 Drawing Sheets

BLIND SEARCH FOR NETWORK POSITIONING REFERENCE SIGNAL (PRS) CONFIGURATION PARAMETERS

CROSS REFERENCE TO RELATED APPLICATION

The present disclosure claims the benefit of U.S. provisional patent application No. 61/874,985, entitled BLIND SEARCH FOR NETWORK POSITIONING REFERENCE SIGNAL (PRS) CONFIGURATION PARAMETERS, by Arash Mirbagheri et al., filed on Sep. 7, 2013, the disclosure of which is expressly incorporated by reference herein in its entirety.

FIELD

Aspects of the present disclosure relate generally to wireless communication systems, and more particularly to a position location system within a wireless communications system.

BACKGROUND

Wireless networks are widely deployed to provide various communication services such as voice, video, packet data, messaging, broadcasting, position location services, and other like wireless communication services. These wireless networks may be multiple-access networks capable of supporting multiple users by sharing the available network resources.

Within wireless networks, positioning and position determination is widely used to locate mobile devices. The position can be used by applications, as well as for system control and signal distribution. Determining the position using a satellite positioning system (SPS) (e.g., global positioning system (GPS)) is often appropriate, but many times, and for certain applications and system functions, SPS data is not sufficient. For example, when indoors, a satellite signal may not be available. Alternate positioning solutions, such as time difference of arrival (TDOA), observed time difference of arrival (OTDOA), and other systems may be desirable for such applications and functions.

SUMMARY

An aspect of the present disclosure provides a method for determining a positioning reference signal (PRS) network configuration. Such a method includes estimating a PRS energy from predetermined locations of each subframe of an incoming signal. Such a method also includes blindly detecting PRS parameters based at least in part on the estimated PRS energy.

An apparatus for wireless communication in accordance with another aspect of the present disclosure includes a receiver configured to receive signals from multiple locations. Such an apparatus also includes at least one processor configured to estimate a PRS energy in predetermined locations of each subframe of an incoming signal and to blindly detect PRS parameters based at least in part on the estimated PRS energy.

A computer program product in accordance with another aspect of the present disclosure includes a non-transitory computer-readable medium having program code recorded thereon. The program code includes program code to estimate a PRS energy in predetermined locations of each subframe of an incoming signal. There is also program code to blindly detect PRS parameters based at least in part on the estimated PRS energy.

An apparatus for wireless communication in accordance with another aspect of the present disclosure includes means for estimating a PRS energy in predetermined locations of each subframe of an incoming signal. Such an apparatus also includes means for blindly detecting PRS parameters based at least in part on the estimated PRS energy.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

System Overview

Various aspects of the disclosure provide techniques for peripheral device location and connection by mobile devices.

Figure 1:
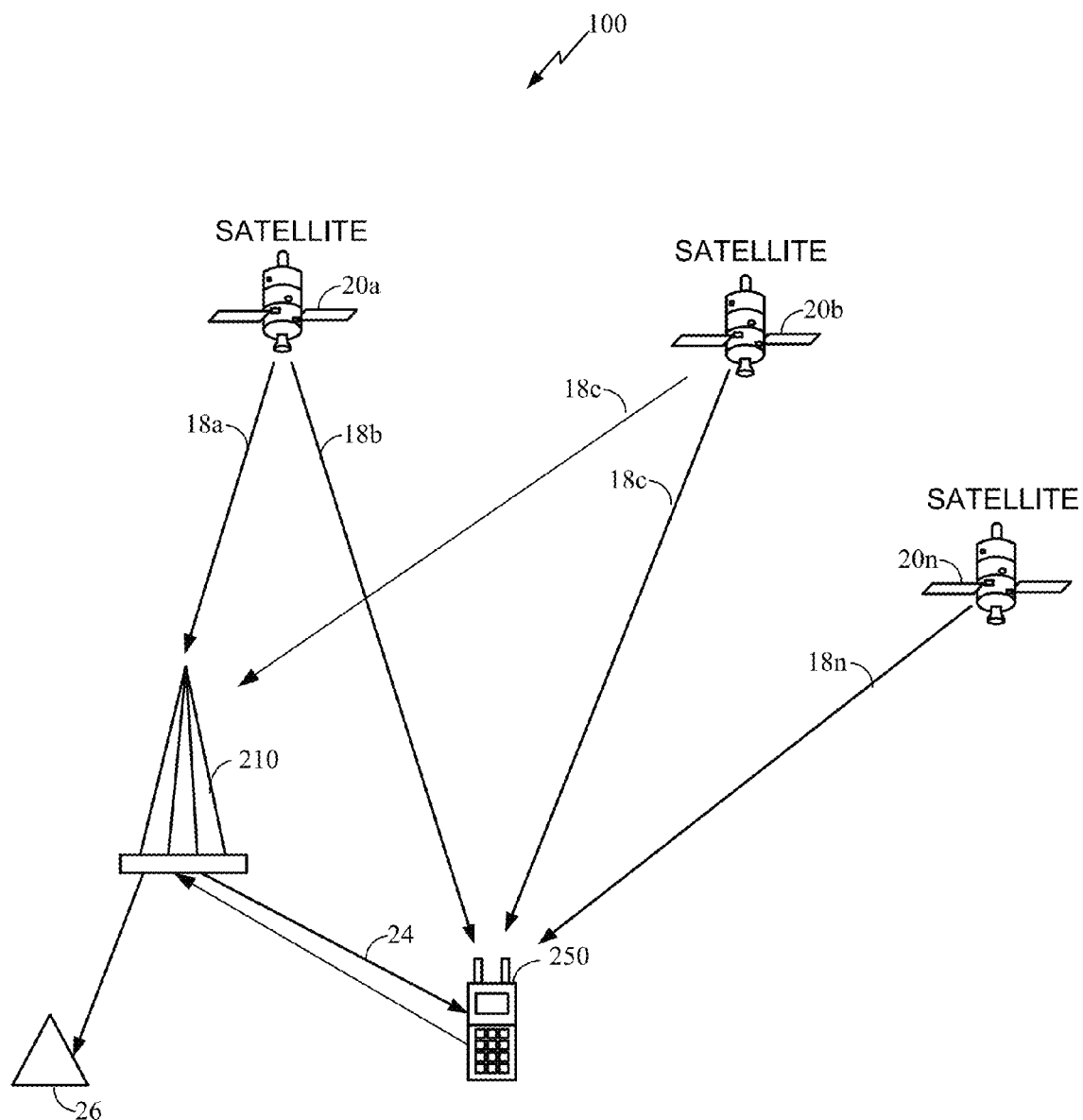
FIG. 1 illustrates a diagram of a communication system according to one aspect of the disclosure.

An example system 100 for location determination is illustrated in FIG. 1. Position location and timing signals 18a-n are transmitted from one or more satellites 20a-n. The position location and timing signals 18a-n transmitted from one or more satellites 20a-n may be received by a first base station, or eNodeB 210 (also known as an access point). The eNodeB 210 may determine its location and time offset from the satellite location and timing signals. The eNodeB 210 may transmit one or more position location signals 24, synchronized to the common satellite system time, to any number of receivers and/or transceivers and/or terminals, including the handset or user equipment (UE) 250. The user equipment 250 has been activated to communicate with the base station (eNodeB) 210 across a mobile wireless communications system, and has a user seeking to establish a position location using satellite position system (SPS) technology included in the user equipment 250. Further, position location and timing signals 18a-18n may be received directly at the user equipment 250. Location related data, such as assistance data and location measurement data, may be transmitted between a user equipment 250, via the eNodeB 210 and to the configuration aggregation (location) server 26. The position location and timing signals 18a-18n include a positioning reference signal (PRS).

Figure 2:
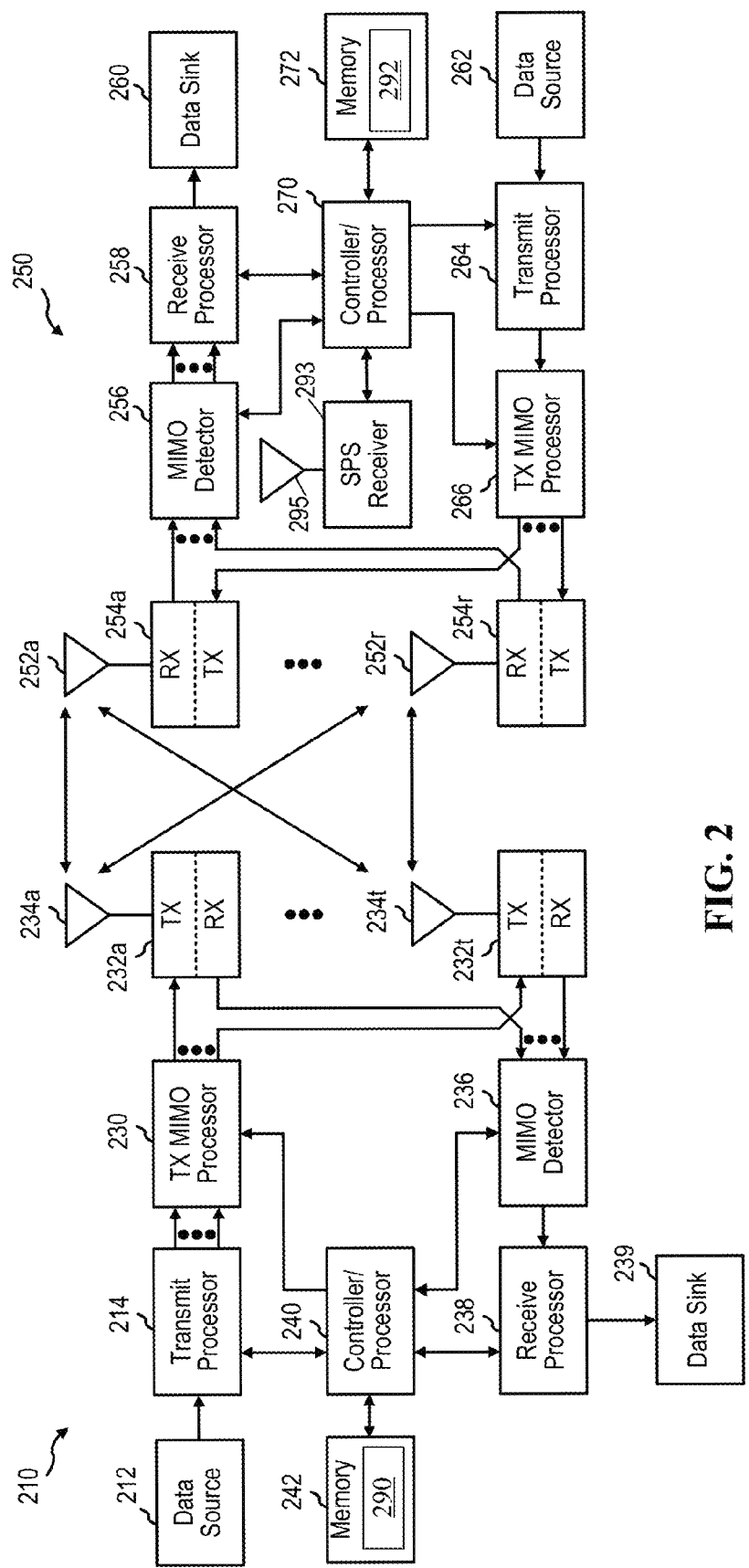
FIG. 2 is a block diagram illustrating an exemplary hardware configuration of wireless nodes used in the communication system, such as the position location system discussed herein.

FIG. 2 shows a block diagram of a design of an eNodeB 210 and a user equipment (UE) 250, each of which may be one of the wireless nodes in FIG. 1. Each of the wireless nodes in the wireless communication system 100 may include a wireless transceiver to support wireless communication and controller functionality to manage communication over the network. The controller functionality may be implemented within one or more digital processing devices. The wireless transceiver may be coupled to one or more antennas to facilitate the transmission and reception of signals over a wireless channel.

In one configuration, the access point (eNodeB) 210 may be equipped with antennas 234 (234a, . . . , 234t), and the 250 may be equipped with antennas 252 (252a, . . . , 252r). Signals are sent at various frequencies, in a frame format, where each frame contains subframes of data where tones, commands, and data are located based on the transmission scheme being used.

At the access point 210, a transmit processor 214 may receive data from a data source 212 and control information from a controller/processor 240. The transmit processor 214 may process (e.g., encode and symbol map) the data and control information to obtain data symbols and control symbols, respectively. The transmit processor 214 may also generate reference symbols, and a cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the transceivers 232 (232a, . . . , 232t). Each of the transceivers 232 may process a respective output symbol stream to obtain an output sample stream. Each of the transceivers 232 may further process (e.g., convert to analog, amplify, filter, and upconvert) the output sample stream to obtain a transmission signal. Signals from transceivers 232 may be transmitted via the antennas 234 (234a, . . . , 234t), on links respectively.

At the user equipment 250, the antennas 252 (252a, . . . , 252r) may receive the signals from the access point 210 and may provide received signals to the transceivers 254 (254a, . . . , 254r), respectively. Each of the transceivers 254 may condition (e.g., filter, amplify, downconvert, and digitize) a respective received signal to obtain input samples. Each of the transceivers 254 may further process the input samples to obtain received symbols. A MIMO detector 256 may obtain received symbols from all of the transceivers 254, perform MIMO detection on the received symbols if applicable, and provide detected symbols. A receive processor 258 may process (e.g., demodulate, deinterleave, and decode) the detected symbols, provide decoded data for the user equipment 250 to a data sink 260, and provide decoded control information to a controller/processor 270.

When transmitting, from the user equipment 250, a transmit processor 264 may receive and process data from a data source 262 and control information from the controller/processor 270. The transmit processor 264 may also generate reference symbols for a reference signal. The symbols from the transmit processor 264 may be precoded by a TX MIMO processor 266 if applicable, further processed by the transceivers 254, and transmitted to the access point 210. At the access point 210, the signals received from the user equipment 250 may be received by the antennas 234, processed by the transceivers 232, detected by a MIMO detector 236 if applicable, and further processed by a receive processor 238 to obtain decoded data and control information sent by the user equipment 250. The receive processor 238 may provide the decoded data to a data sink 239 and the decoded control information to the controller/processor 240. The access point 210 can send messages to other base stations, for example, over a backhaul link.

The controller/processor 240 may direct the operation at the access point 210 and the controller/processor 270 may direct the operation at user equipment 250, respectively. The controller/processor 270 and/or other processors and modules at the user equipment 250 may perform or direct the execution of the functional blocks illustrated in method flow charts of FIGS. 6, 7, and 10, and/or other processes for the techniques described herein. The memory 242 may store data and program codes for the access point 210 and the memory 272 may store data and program codes for the user equipment 250.

As shown, the controller/processor 270 and memory 272 may contain a variety of components to enable the user equipment 250 to receive, process, store, and execute instructions in connection with data and information about position location data, including position location and timing signals 18a-n (FIG. 1), and base station position location signal 24 (FIG. 1) that includes position location data.

The controller/processor 270 illustrated in FIG. 2 of the user equipment 250 includes a set of computer instructions (in this document, "instructions") for implementing the methods described in this document. The instructions 292 are illustrated in FIG. 2 diagrammatically solely as an aid in understanding the methods described in this document. The instructions may be stored in various internal memory 272 or may be implemented in hardware. The instructions may also be included in a computer processing system of a computer located external to the user equipment 250, for example, on a secured intranet, on the Internet, or at a base station 22 or location server 26, from which they may be transmitted to the user equipment 250. Data associated with the instructions may be received, stored, processed and transmitted to the user equipment 250, but only a single user equipment (also referred to as a mobile device) 250 is illustrated to enhance clarity. Data associated with the instructions also may be received, stored, processed and transmitted to/from a plurality of eNodeB 210 or location servers 26, but only a single base station/eNodeB 210 and location server 26 is illustrated in FIG. 1 to enhance clarity. Alternately, data associated with the instructions also may be received, stored, processed and transmitted to/from a computer server connected to a network.

The user equipment 250 may contain a Satellite Positioning System (SPS) receiver 293, which may be one or more of the transceivers/receivers 254 or be a separate receiver 293, capable of receiving Satellite Positioning System (SPS) signals 18 via SPS antenna 295. The separate receiver 293 may be a SPS receiver. The separate receiver 293 may also process, in whole or in part, the Satellite Positioning System (SPS) signals 18 and use the SPS signals 18 to determine the location of the user equipment 250. In some configurations, the controller/processor 270 may also be utilized to process the SPS signals 18, in whole or in part, and/or calculate the location of the user equipment 250, in conjunction with the receiver 293. The storage of SPS or other location signals may be done in the memory 272 or registers.

In certain implementations, the user equipment 250 may receive SPS signals 18 from SPS satellites 20. In some embodiments, the SPS satellites 20 may be from one global navigation satellite system (GNSS), such as the GPS or Galileo satellite systems. In other embodiments, the SPS satellites 20 may be from multiple GNSS such as, but not limited to, GPS, Galileo, Glonass, or Beidou (Compass) satellite systems. A mobile device may also communicate with a wireless network base station (eNodeB) 210 via wireless signals. As described below, the user equipment 250 may be a laptop, tablet, mobile phone (e.g., smartphone), netbook, smartbook, ultrabook, or other suitable device.

Detection by a mobile device may be divided into two phases, Positioning and Discovery, though the two phases may overlap in certain respects. Once a desired peripheral device is identified, the mobile device may connect to the peripheral device.

A mobile device (user equipment 250) may determine its location using a location detecting algorithm. Outdoors, a geo-locator system, such as the global positioning system (GPS) or other method may be used. Indoors, an indoor positioning algorithm such as Qualcomm's INNAV may be used. Further positioning location may be accomplished using other techniques such as a Wi-Fi Access Point (AP). Each AP broadcasts beacon frames containing a service set identifier (SSID) and media access control (MAC) ID. The mobile device may estimate its distance from the AP using ranging and trilateration techniques. The user equipment 250 may also identify a position profile by determining which access points it can see.

A user equipment 250 may then use several techniques to determine nearby equipment. In a beacon based technique, equipment may transmit periodic beacons with positioning information. That positioning information may be coordinates (such as in a geo-locator or indoor navigation system) or other location information.

Another discovery technique may employ proximity detection based on signals received from peripheral devices. For example, a user equipment 250 may judge its proximity to peripheral devices through the strength of a received signal from the peripheral devices.

Another discovery technique may employ a central repository or server 26 which contains location information. The user equipment 250 may query the central repository, provide its own location, or request location information from the central repository, either directly or via the eNodeB 210. The information from the central repository may also include directional information relative to the location of the user equipment 250.

The present disclosure describes methods, apparatuses, and computer program products, that blindly search and detect the positioning reference signal (PRS) configuration parameters in the network (e.g., wireless communication system 100).

Figure 3:
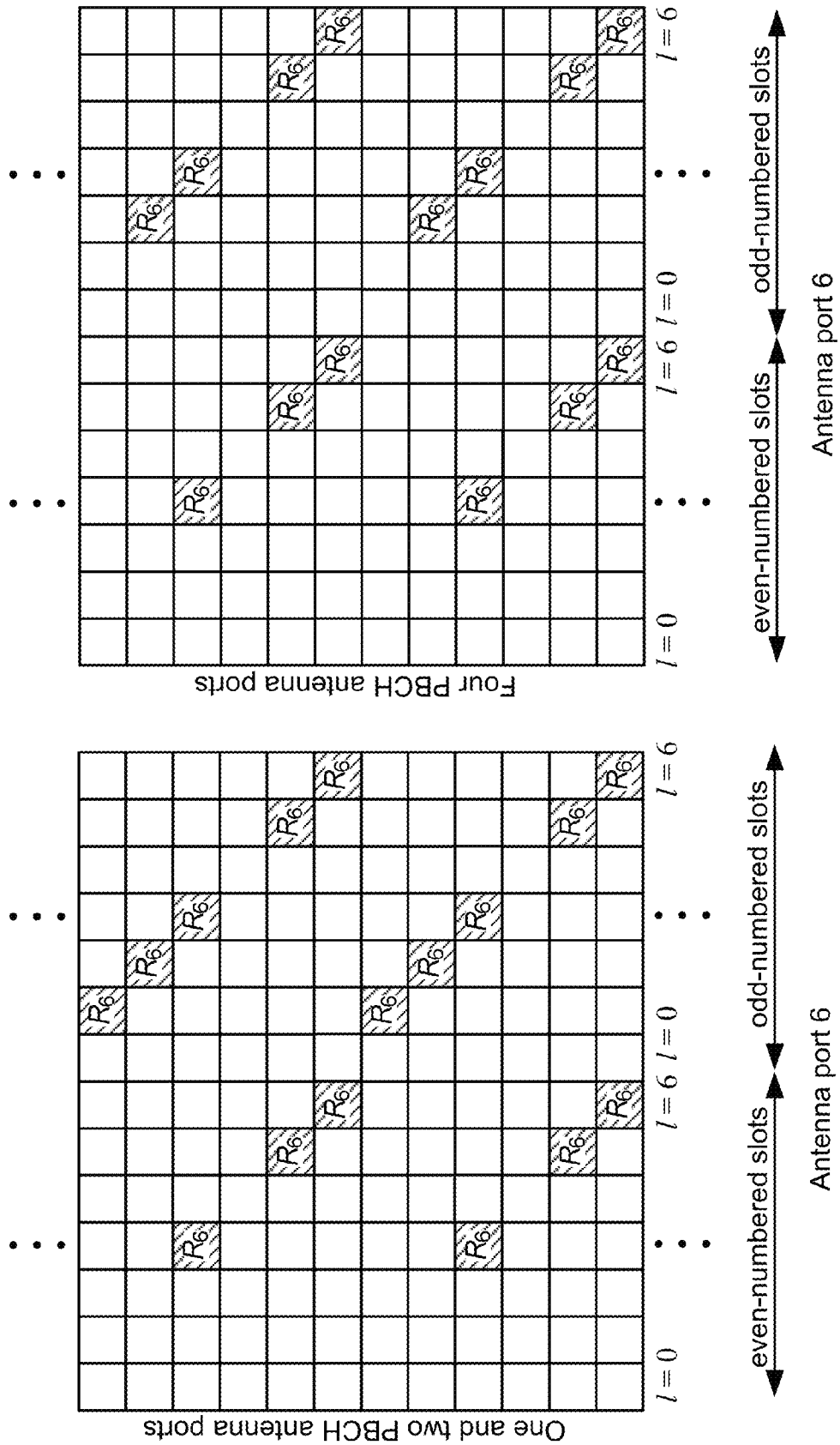
FIG. 3 illustrates a mapping of the positioning reference signal (PRS) with normal cyclic prefix according to one aspect of the disclosure.
Figure 4:
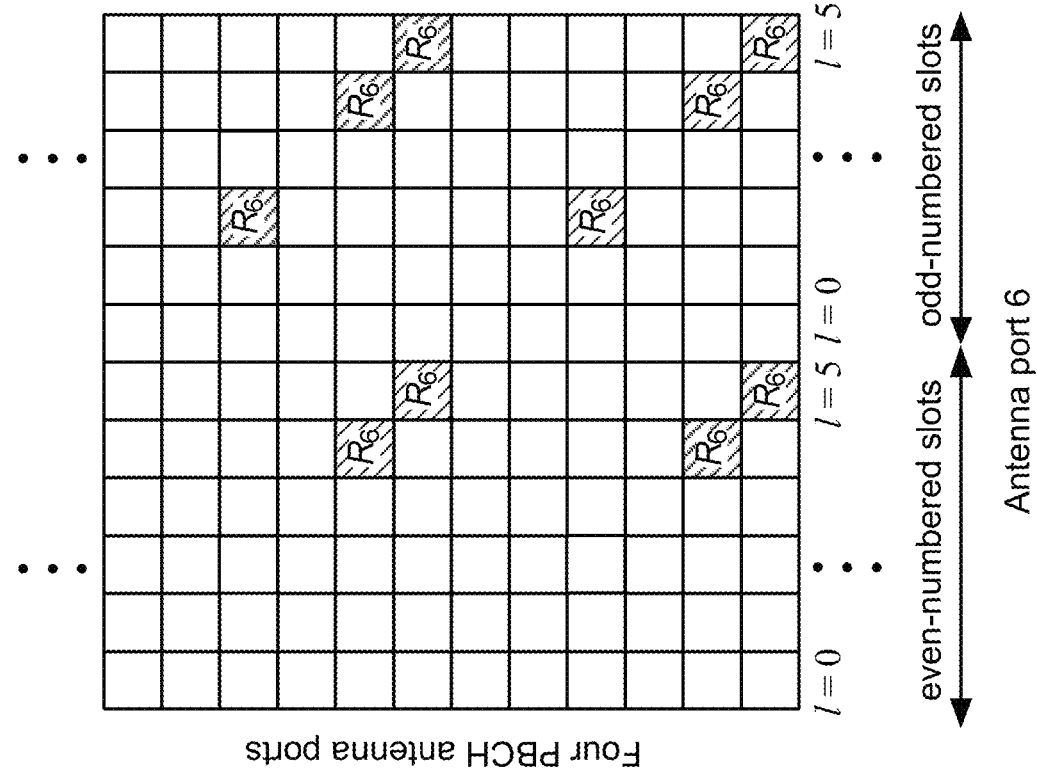
FIG. 4 illustrates a mapping of the positioning reference signal (PRS) with extended cyclic prefix according to one aspect of the disclosure.
Figure 4:
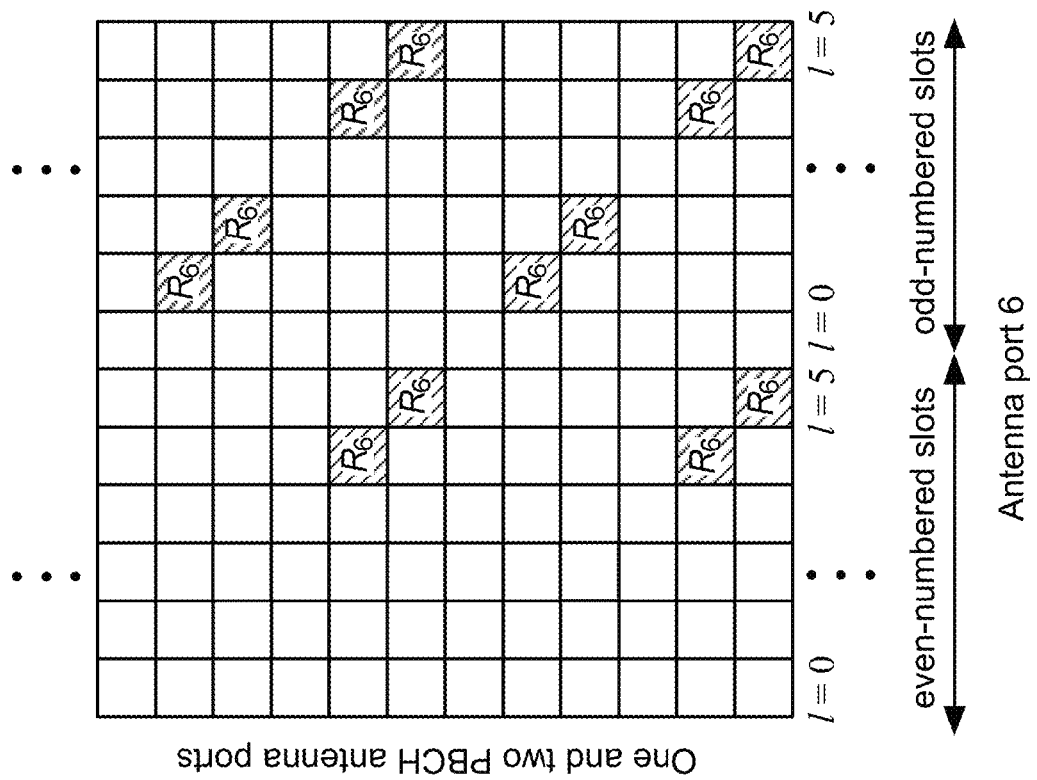

As shown in FIGS. 3 and 4, the PRS may only be transmitted in certain resource elements in downlink subframes that are configured for PRS transmission. The PRS may be transmitted by a specific antenna port, such as antenna port 6, from the eNodeB 210. FIG. 3 shows the resource elements assigned to PRS for normal cyclic prefix transmissions, based on the number of physical broadcast channel (PBCH) antennas. FIG. 4 shows the resource elements assigned to PRS for extended cyclic prefix transmissions, based on the number of PBCH antennas. The frequency offset of PRS tones in FIG. 3 and FIG. 4 depends on the Physical Cell ID (PCID) value.

The PRS may use QPSK modulation scrambled with a pseudo-random sequence with a seed initialization dependent on slot number, $n_s$ and cell ID, $N_{ID}^{cell}$, as follows:

$$c_{init}=2^{10}(7(n_s+1)+l+1)\cdot(2N_{ID}^{cell}+1)+2N_{ID}^{cell}+N_{CP}$$

Because the seed formula is dependent on the cell ID (i.e., PCID), symbol number, and slot number (which may be generated by the processor 214), it is difficult to mistake the PRS of a neighbor cell with the PRS of a serving cell. The PRS is mapped to resource elements (REs) within a resource block (RB) of the downlink signal shown in FIG. 2. An eNodeB 210 may comprise multiple cells. Each cell within an eNodeB 210 has a PCID and may have its own cell-specific PRS signals.

The PRS bandwidth is configured by higher layers and can be smaller than the wireless communication system bandwidth. PRS tones have a frequency re-use of 6 whose offset is determined by frequency shift $v_{shift}=N_{ID}^{cell}$ mod 6.

In a first aspect, a cell of the eNodeB 210 provides the PRS configuration parameters to the user equipment 250 directly such that the user equipment 250 can determine the observed time differential of arrival (OTDOA) of various signals to assist the user equipment 250 in determining the user equipment position (e.g., longitude, latitude, direction and distance from the eNodeB 210, etc.). The user equipment may send the OTDOA measurements to a separate computer, or position/location server 26, to determine the position of the user equipment 250. This aspect may be called a network-assisted OTDOA process.

The user equipment 250 may be furnished with OTDOA assistance data containing the primary configuration parameters of PRS transmission. These parameters include PRS bandwidth, PRS configuration index ($I_{PRS}$) which conveys the subframe offset for the start of PRS occasions and their periodicity ($T_{PRS}$), the number of successive subframes ($N_{PRS}$), and the PRS muting pattern.

The use of the wireless communication system 100 to send the PRS parameters to the user equipment 250 means that these parameters are sent periodically to all the user equipment 250, so each user equipment 250 may be aware of its position without relying on the server 26 or the network. As such, in mobile-originated positioning applications running on the user equipment 250, it is desirable for the user equipment 250 to determine these parameters itself without relying on assistance data from the wireless communication system 100.

The user equipment 250, when joining the wireless communication system 100 via registration, may be given data related to the cyclic prefix type (CP) and the number of transmit antennas. Alternatively, or in conjunction, the user equipment 250 can determine these parameters via normal demodulation procedures.

The present disclosure may use one or more searching modes to determine the PRS transmission parameters. A first aspect of the present disclosure includes a shallow search mode. The shallow search mode is a search mode where the user equipment 250 performs extraction and descrambling of the PRS tones for the last two symbols of each slot in each subframe. The shallow search mode subsequently runs an estimation, which may be a signal/signal plus noise (S/S+N) estimation, using these four vectors for each transceiver 254.

Shallow Search Mode

The shallow search mode may estimate the PRS signal over signal plus noise ratio (S/S+N) in every subframe without relying on more complex PRS processing, such as an earliest arrival path (EAP) detection.

Figure 5:
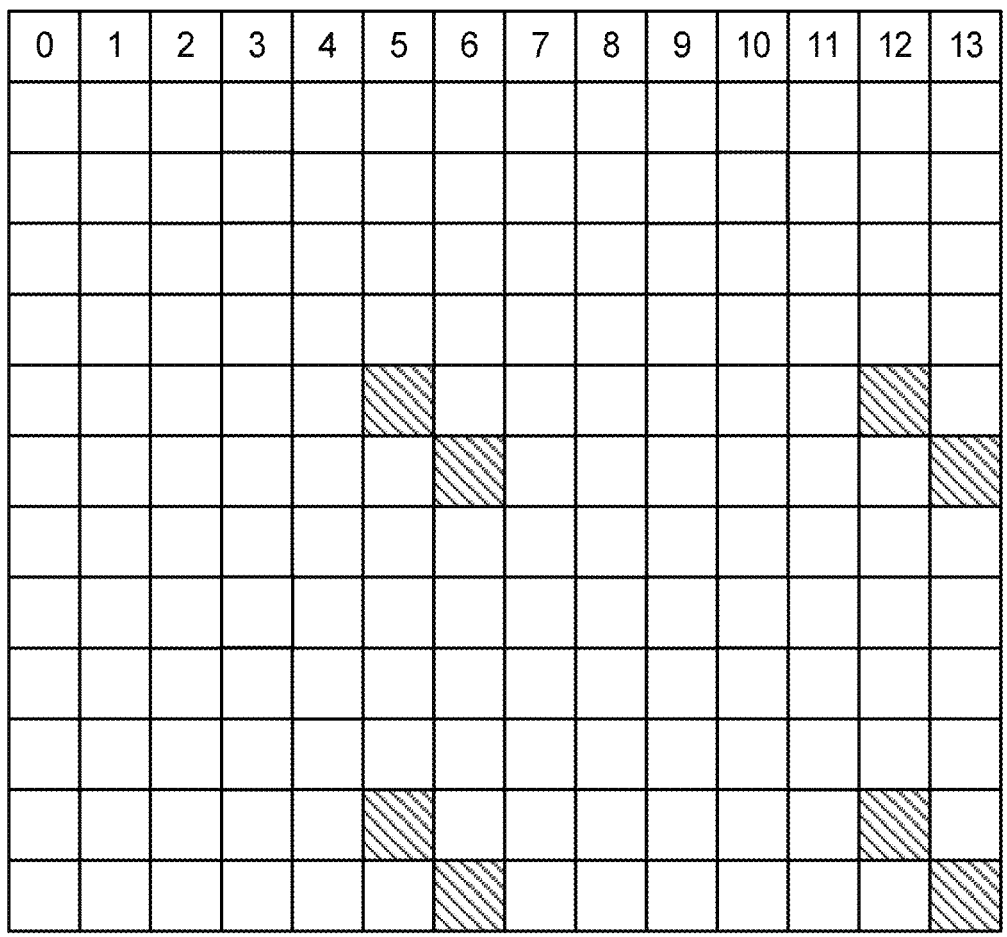
FIG. 5 illustrates location of candidate symbols within a subframe for PRS detection.

The shallow search mode of the present disclosure can be performed in close to real-time, as it does not rely on more complex algorithms. In an aspect of the disclosure, the shallow search mode may include performing PRS symbol processing for the symbols shown in FIG. 5. As noted above, the last two symbols of each subframe are searched. FIG. 5 shows that only the last two symbols of PRS locations are searched, in contrast to FIG. 3, which shows the PRS locations in all symbols (for a standard (normal) cyclic prefix).

In an aspect of the disclosure, the shallow search mode may include performing PRS symbol processing for the symbols shown in FIG. 5. As noted above, the last two symbols of each subframe are searched. FIG. 5 shows that only the last two symbols of PRS locations are searched, in contrast to FIG. 3, which shows the PRS locations in all symbols (for a standard (normal) cyclic prefix)

To perform a signal to noise ratio (SNR) estimation, the last two symbols of each slot in a PRS subframe are considered to form 4 vectors in the frequency domain, respectively labelled $\bar{r}_0$, $\bar{r}_1$, $\bar{r}_2$, and $\bar{r}_3$. The signal estimate is obtained as:

$$S = \frac{1}{2}\left(\frac{\bar{r}_0^H \cdot \bar{r}_2}{|\alpha|^2} + \frac{\bar{r}_1^H \cdot \bar{r}_3}{|\beta|^2}\right)$$

Where $\alpha$ and $\beta$ are the scaling factors applied to $\bar{r}_0$, $\bar{r}_2$ and $\bar{r}_1$, $\bar{r}_3$ respectively. A signal-plus-noise estimate is obtained as:

$$SN = \frac{1}{2}\left(\frac{|\bar{r}_0|^2}{|\alpha|^2} + \frac{|\bar{r}_3|^2}{|\beta|^2}\right)$$

For SN estimation, all 4 vectors ($\bar{r}_0$, $\bar{r}_1$, $\bar{r}_2$, and $\bar{r}_3$) can be used but only the first and last vectors are used to have equal processing gain as the estimation of signal S. Using the above equations, S/(S+N) can be estimated as $$\gamma = \frac{\max(\mathrm{Re}\{S\}, 0)}{SN}$$

The accuracy of the SNR estimate formulated above depends on the length of the vectors (or the PRS bandwidth). The S (complex) and SN (real) metrics from each subframe of each cell of each Rx chain are stored to form a final SNR metric at the end of the last subframe.

The shallow search mode may also include performing a PRS signal over signal plus noise (S/S+N) processing on the output of the four vectors. The shallow search mode may further include reading out signal over signal plus noise results and calculate instantaneous S/(S+N) values. This procedure is repeated for every potential PRS bandwidth and every subframe and every receive chain.

Deep Search Mode

In another aspect of the present disclosure, a different search mode, which may be referred to as the "deep search" mode, may be used. The deep search mode may refer to a search mode where all the PRS processing takes place as normal. The deep search mode may include extraction of all PRS symbols, S/S+N estimation, tone combining, subframe processing, occasion processing, obtaining a final channel energy response (CER) and running the earliest arrival path (EAP) detection algorithm on it.

Compared to the shallow search mode aspect of the present disclosure, the deep search mode may be much slower, taking a few milliseconds to complete. However, the deep search mode may be more reliable than the shallow search mode, and may be desired for specific applications or situations.

The deep search mode, in an aspect of the present disclosure, may further include the following additional features.

The PRS bandwidth and number of successive subframes ($N_{PRS}$) may be set according to the hypothesis from the shallow search mode. The number of transmit antennas 234 may be known and relayed by the eNodeB 210.

The search window may be reduced as a PRS parameter search is performed based on a UE's serving cell.

Design Criteria

A design in accordance with an aspect of the present disclosure may be based on the following criteria.

The user equipment 250 may perform a search for the PRS parameters on the serving cell signal. Thus, the serving cell (eNodeB) 210 broadcasts PRS parameters. If no PRS is received, the user equipment 250 reports that no broadcast has been received for this cell.

In one configuration, no inter-frequency handover occurs during the search process. This is so because PRS parameters may vary across frequencies. If an inter-frequency handover occurs, the search process can be aborted. In another configuration, intra-frequency handoff is permitted in shallow search mode, but not in deep search mode because the muting pattern differs from cell to cell.

The user equipment 250 has a radio link with the eNodeB 210 of sufficient quality to maintain an LTE phone call.

Search System Description

An aspect of the present disclosure may be based on a combination of shallow and deep search modes. When there is no a priori information on any of the PRS parameters, the user equipment 250 may start in shallow search mode and scan every subframe with the $H_{BW}$ hypothesis for every possible PRS bandwidth smaller than, or equal to, the system bandwidth (SYS BW). For example, if the system bandwidth is 10 MHz, $H_{BW}=4$ corresponding to the PRS bandwidths of 1.4 MHz, 3 MHz, 5 MHz, and 10 MHz For each PRS bandwidth hypothesis, the S/(S+N) is estimated independently and for each receive chain. If the S/(S+N) exceeds a detection threshold $TH_{Detect}$, then PRS is assumed to be present in that bandwidth. If the PRS occupies a certain bandwidth, the S/(S+N) for that bandwidth, and all the smaller subsets, will also exceed the detection threshold and be approximately the same. Thus, once the PRS is found in a larger bandwidth, the other smaller PRS bandwidths are not searched.

The bandwidth hypotheses are sorted based on the S/(S+N) value with some correction factor used to account for the difference in processing gains. The highest bandwidth may then be selected as a candidate for the PRS bandwidth. Consequently, a PRS is declared to be present in the subframe that is selected as a candidate. The first subframe of a PRS occasion is specially marked, and the number of subframes in a PRS occasion is hypothesized to be the last subframe where the PRS signal was present minus the first one conditioned to be a valid value of 1, 2, 4, or 6.

The shallow search continues until a certain number of PRS candidates (occasions where the PRS is declared to be present) are detected, which may be at least $N_{shallow}$ PRS occasions. These occasions may comprise a candidate set for the PRS bandwidth and $N_{PRS}$ is formed where each set can have up to $N_{shallow}$ members (one for each of $N_{shallow}$ occasions).

From the shallow search mode aspect of the present disclosure, the user equipment 250 may also determine the potential timing of PRS occasions. If any of the two successive PRS occasions occur within 160 ms, then $T_{PRS}=160$ ms. Otherwise, the period may or may not be larger than 160 ms due to the PRS muting pattern.

After the shallow search mode is completed for all bandwidths, the user equipment 250 may begin deep search mode. The deep search mode may be timed to occur every 160 ms from the timing of detected PRS occasions in shallow search mode.

In the deep search mode, the user equipment 250 may narrow down the candidate set for the PRS bandwidth and $N_{PRS}$ by looking at the peak quality from the CER vector and selecting the candidate with the highest peak quality. Furthermore, the deep search mode may continue for $$16 \times N_{deep} \times \frac{T_{PRS,candidate}}{160}$$

where N_deep is the number of times that the entire muting pattern of length 16 is desired to be covered and $T_{PRS,candidate}$ is the candidate for the PRS period which comes from the shallow search.

The PRS period is 160 ms if two successive occasions with 160 ms distance were detected, otherwise the PRS period used is 640 ms. Although the maximum PRS period can be 1280 ms, the muting pattern length cannot be 16 for this period as the system frame number (SFN) which determines the bit location in the muting bit string wraps around after 8 occasions with a 1280 ms period. So the longest run is either 8×1280 ms or 16×640 ms, which are equivalent.

In each PRS occasion, the deep search may have the opportunity to narrow down the list of candidates for PRS bandwidth and $N_{PRS}$ by examining multiple hypotheses at a time. On top of this, the deep search may also determine the muting pattern and PRS period by looking for a peak every 160 ms.

Detailed Design

Figure 6:
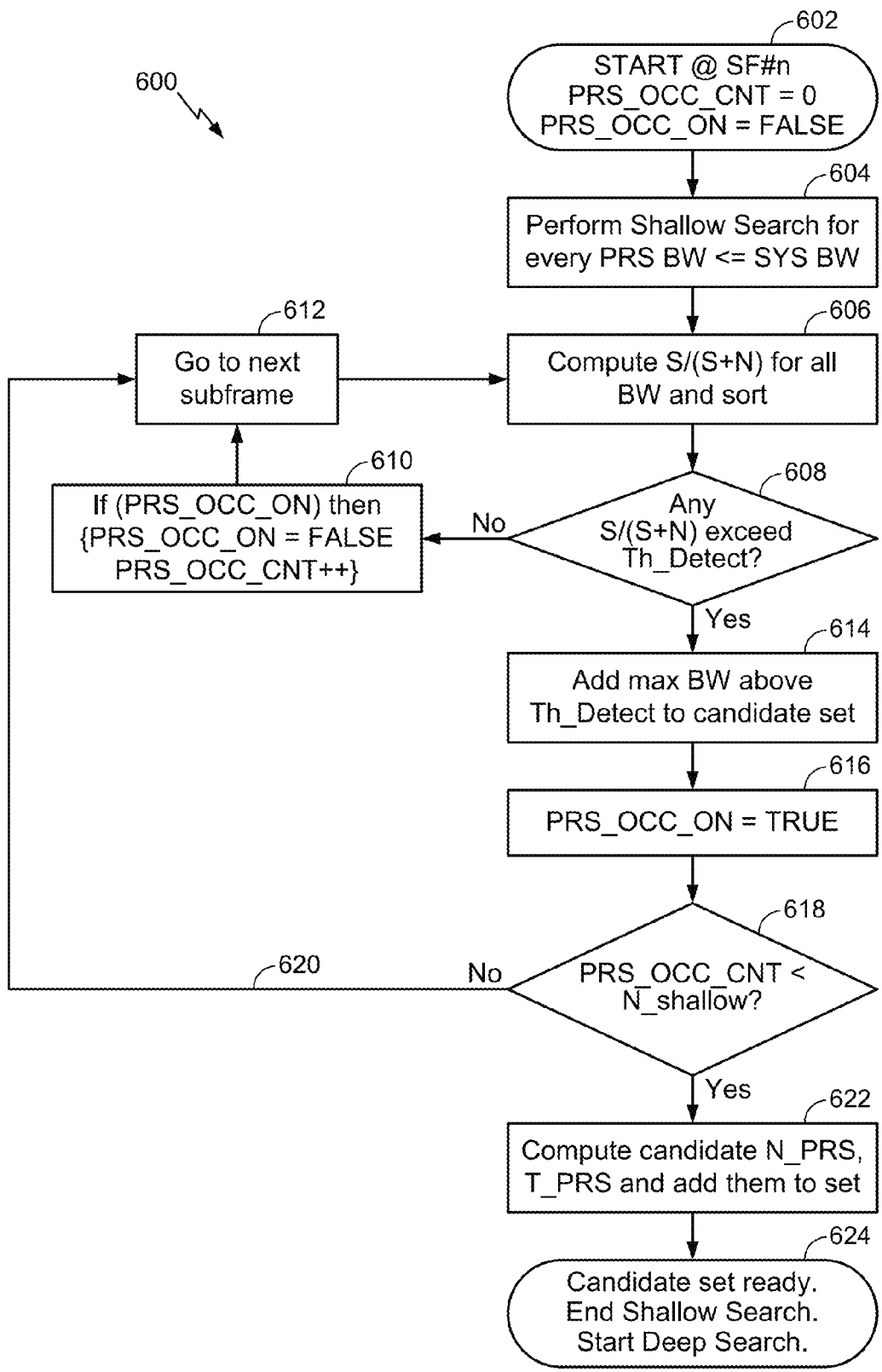
FIG. 6 is a flow chart illustrating an example of a shallow search according to an aspect of the present disclosure.

FIG. 6 illustrates a flowchart for a shallow search mode in accordance with an aspect of the present disclosure.

The flow chart 600 shows an aspect of the present disclosure for a shallow search. A shallow search can start from an arbitrary subframe by setting a counter to zero and a flag to false as shown in box 602. In every subframe, tone extraction and S/(S+N) estimation is executed for every PRS bandwidth equal to and smaller than the system bandwidth for each receive chain as shown in box 604. For each PRS bandwidth, the maximum S/(S+N) over the receive chains is selected for comparison as shown in box 606.

The estimated S/(S+N) is compared with a detection threshold $TH_{Detect}$ in box 608. The detection threshold may be selected based on the assumption that the entire blind search procedure is performed on the signal of the serving cell. A threshold may be set, for example, at −6 dB, as the serving cell PRS is designed to be above −6 dB and the range above −6 dB may be estimated with good accuracy even with low processing gains.

If no estimated S/(S+N) exceeds this threshold, then the PRS is declared to be absent in this subframe in box 610 and the search proceeds to the next subframe in box 612. Otherwise, the estimated S/(S+N) values are sorted, which may be in a decreasing or increasing order. The maximum bandwidth corresponding to the estimated S/(S+N) value is selected to go in the candidate set for the PRS bandwidth in box 614. For example, if the overall system bandwidth is 10 MHz and the PRS bandwidth is 5 MHz, then the expectation is that the estimated S/(S+N) values based on 1.4 MHz, 3 MHz, and 5 MHz all roughly result in the same value whereas the estimated value for S/(S+N) for 10 MHz will be significantly lower as the noise term will be higher.

Consequently, the beginning of a PRS occasion is marked by initializing a variable in box 616. The next time, all estimated S/(S+N) values drop below the threshold, a flag is set to false again and a candidate for $N_{PRS}$ is estimated subject to the valid values of $N_{PRS}$. This search goes on until $N_{shallow}$ occasions are detected as shown by decision box 618 and path 620. By the end of this decision loop, a candidate set for the PRS bandwidth and $N_{PRS}$ is formed as shown in box 622. It is also possible to determine $T_{PRS}=160$ ms if two successive occasions are 160 subframes apart as shown in box 622. Otherwise, $T_{PRS}$ cannot be further narrowed down. As shown in box 624, the candidate set for the PRS bandwidth, and, if possible, the PRS period (T_PRS), are determined, and a deep search is performed on the candidate PRS set.

Figure 7:
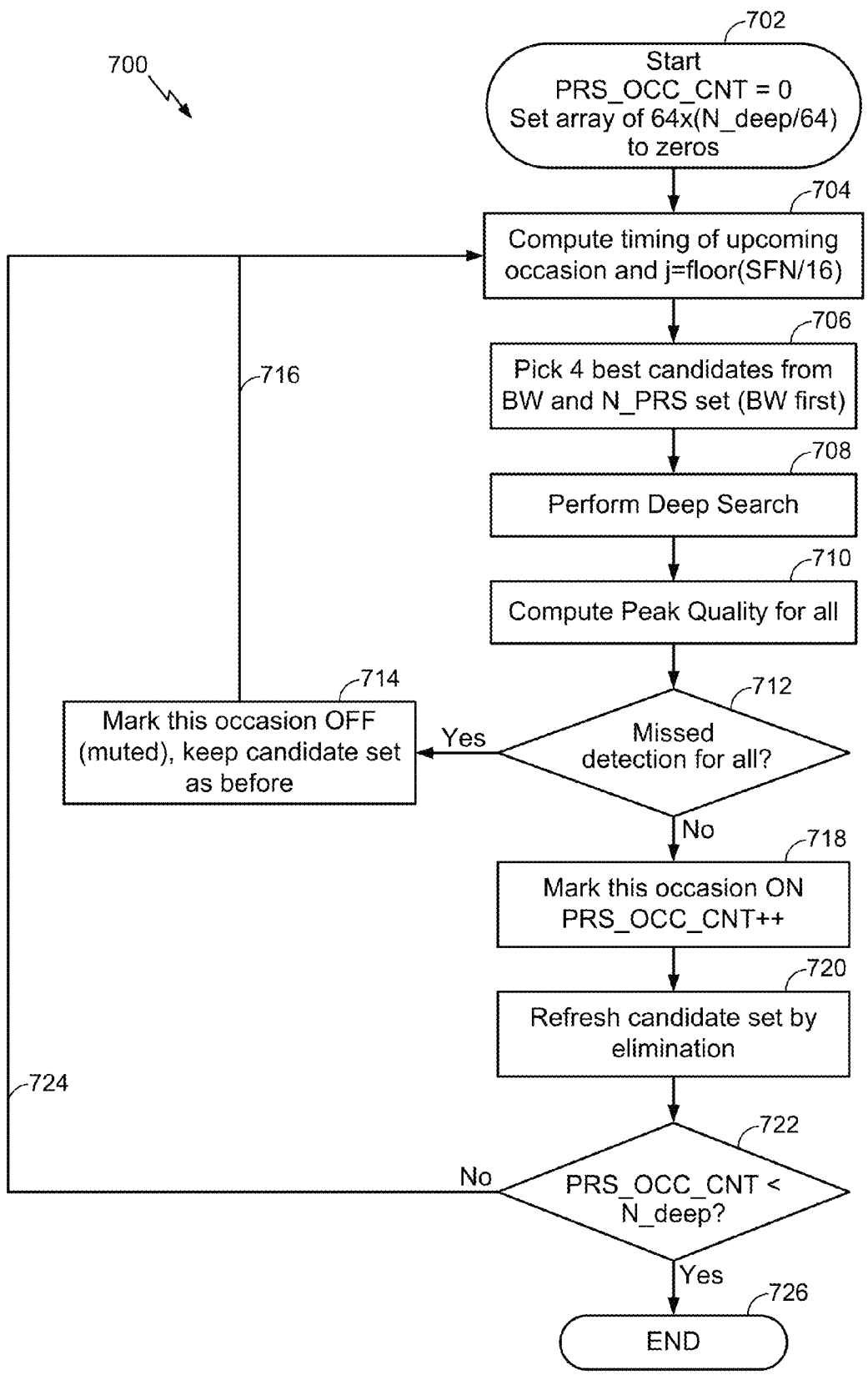
FIG. 7 is a flow chart illustrating an example of a deep search according to one aspect of the disclosure.

FIG. 7 illustrates a flowchart in accordance with an aspect of the present disclosure for a deep search mode.

Flow chart 700 shows deep search starting from the next PRS occasion with its timing estimated as in the shallow search mode. The PRS occasion counter is initialized and an array (for example of length=64×($N_{deep}$/64)) is formed and populated by zeroes as shown in box 702. The location of the upcoming row and column of the occasion in the array is calculated as shown in box 704. Next, multiple candidates (four candidates in an exemplary configuration) from the PRS bandwidth set and the $N_{PRS}$ set are selected as shown in box 706. This may be performed with the PRS bandwidth selected first, followed by the $N_{PRS}$.

A deep search is then executed as shown in box 708, followed by EAP detection and computation of peak quality for every candidate as shown in box 710. If none of the peak qualities exceed the detection threshold, then this occasion is marked as OFF (or muted) and the candidate set is kept as is, as shown by decision block 712 and box 714. The search then proceeds to the next upcoming occasion via path 716.

Otherwise, this occasion is marked as ON, and the PRS occasion counter is incremented as shown in box 718. The peak qualities are compared to potentially eliminate incorrect candidates from the set as shown in box 720. For example, if $N_{PRS}$=2, then integration over 2 subframes should lead to a higher peak quality compared to any other candidate for $N_{PRS}$.

The search continues until $N_{deep}$ occasions are detected as shown by decision block 722. Until the proper number of occasions are reached, path 724 is followed to repeat the search process. Once the proper number of occasions are reached, the most likely (top) candidates for the PRS bandwidth, $N_{PRS}$, and $T_{PRS}$ are selected for reporting and the process ends (block 726). The muting bit in each occasion may be decided by counting the number of 1's in each column of the array from box 702 and comparing them with the number of zeroes in the same column. If the number of 1's is greater than the number of zeroes in that column, then that bit is decided to be ON in the bit-string.

Alternatively, the user equipment 250 may transmit or otherwise send the candidate set to a server, such as the server 26, and the server may determine the candidate PRS period, PRS bandwidth, and/or the PRS occasions/locations within a subframe. Further, the user equipment 250 may send raw measurements, e.g., the selected PRS period, PRS bandwidth, and/or the PRS occasions/locations, or the selected candidate, to a server, such as the server 26. In other words, the processing of the signals determine the PRS configuration may be performed at the user equipment 250, the server 26, or any combination of user equipment 250, server 26, or other processing capabilities within the wireless communication system.

Further, multiple user equipments 250 may each transmit portions of the subframe measurements to the server 26, or other servers within the wireless communication system. The server 26 can aggregate or otherwise combine these portions of the subframe to determine the candidate PRS period, PRS bandwidth, and/or the PRS occasions/locations within that subframe. The processing, reception, and PRS determinations may be distributed between the user equipment 250 and the server(s) 26 within the wireless communication system without departing from the scope of the present disclosure.

Figure 8:
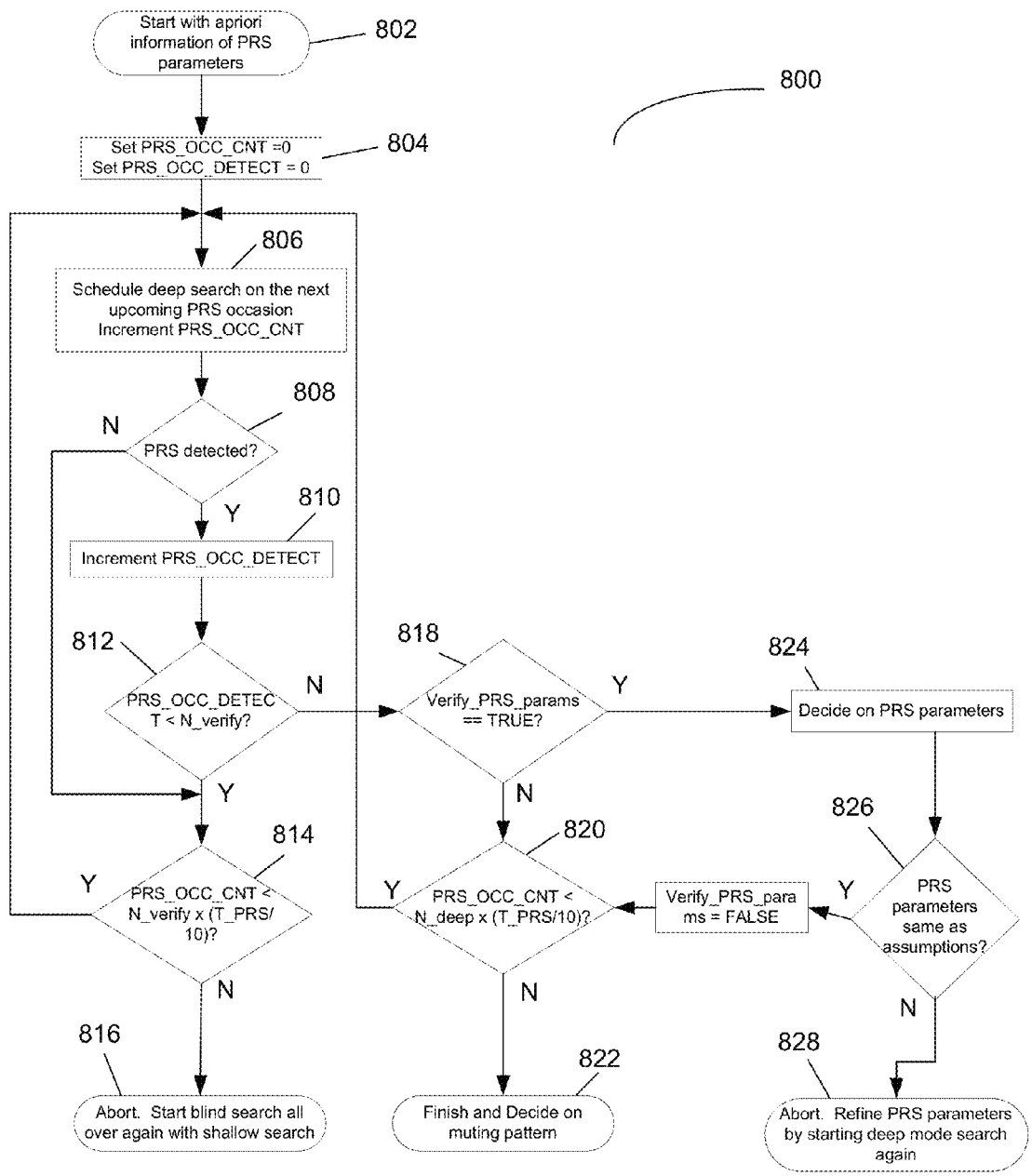
FIG. 8 illustrates a flowchart describing a verification mode in accordance with an aspect of the present disclosure.

FIG. 8 illustrates a flowchart describing a verification mode in accordance with an aspect of the present disclosure.

The flowchart 800 shows a logical path for a Verification Mode; which refers to a mode where a priori PRS information is available to the user equipment 250. As an example, block 802 indicates when the user equipment 250 has searched and found PRS information on one cell and has then made an intra-frequency handover. The user equipment 250 can use this knowledge about PRS parameters with fair certainty, and thus only employs the deep search mode using the known PRS parameters as search parameters.

Block 804 initializes the PRS occasion counter and detector parameters to zero. Whether the user equipment 250 has the knowledge of its serving cell's muting pattern or not, block 806 shows that the user equipment 250 will schedule a deep search on the next upcoming PRS occasion even if it is flagged as an OFF occasion by its known muting pattern. The reason is that the PRS muting pattern can change from time to time in the network, for example, with the introduction of new pico cells and/or other network evolutions. A PRS occasion counter is also incremented in block 806.

Blocks 808-814 illustrate that the user equipment 250 has a timer to detect PRS occasions in $N_{verify}$ sweeps of the entire muting pattern string. For example $N_{verify}$=2 means detecting 2 PRS occasions in 2 sweeps of a muting pattern of maximum length sixteen. If a PRS is not detected in block 808, control passes to block 814, where the values of $N_{verify}$×T_PRS/10 and the PRS occasion counter are compared. If the PRS occasion counter is greater than or equal to $N_{verify}$×T_PRS/10, then the deep search is aborted in block 816 and a blind search is initiated, starting with a shallow search. The known PRS information is deleted. This occurs when the timer has expired.

If the timer has not expired (block 814:Yes), the process returns to block 806 for another deep search to attempt to locate a PRS.

If a PRS is detected in block 808, block 810 shows that a PRS occasion detector, is incremented, and control passes to block 812. Block 812 determines whether the user equipment 250 detects $N_{verify}$ PRS occasions successfully. If not the process flows to block 814. Similarly, if a PRS is not detected at block 808, the process flows to block 814.

If enough PRS occasions are determined to have been detected, at block 812, the process proceeds to block 818. In block 818, the decision block determines if the PRS parameters are present. If they are present, control passes to block 824. If not, control passes to block 820. At blocks 824 and 826 it is determined if the PRS parameters extracted from these $N_{verify}$ occasions are different from the initial assumption. If different, at block 828 the user equipment enters the deep search mode to refine the PRS parameters.

If detecting $N_{verify}$ occasions is successful and the PRS parameters extracted from the PRS occasions are the same as the initial assumption (block 826:Yes), the user equipment 250 passes control to block 820. In block 820, if the PRS occasions are more than or equal to the number in a deep search for a portion of a PRS period (N_deep×T_PRS/10), control passes to block 822 where the user equipment proceeds with a sweep of the entire muting pattern string to come up with the muting pattern of the serving cell.

Handover Interruptions

If an inter-frequency handover occurs while a shallow or deep search in accordance with the present disclosure is ongoing, the search may be aborted and no information or candidate set may be saved.

If an intra-frequency handover occurs while a shallow search in accordance with the present disclosure is ongoing, the candidate sets for all parameters and the number of detected PRS occasions prior to the handover so far may be stored as history and the user equipment 250 may continue the shallow search based on the saved history after the intra-frequency handover is completed.

If an intra-frequency handover occurs while a deep search in accordance with the present disclosure is ongoing, the candidate sets for all parameters may be stored. The counter and the database for muting patterns may be reset, which effectively restarts the deep search.

Figure 9:
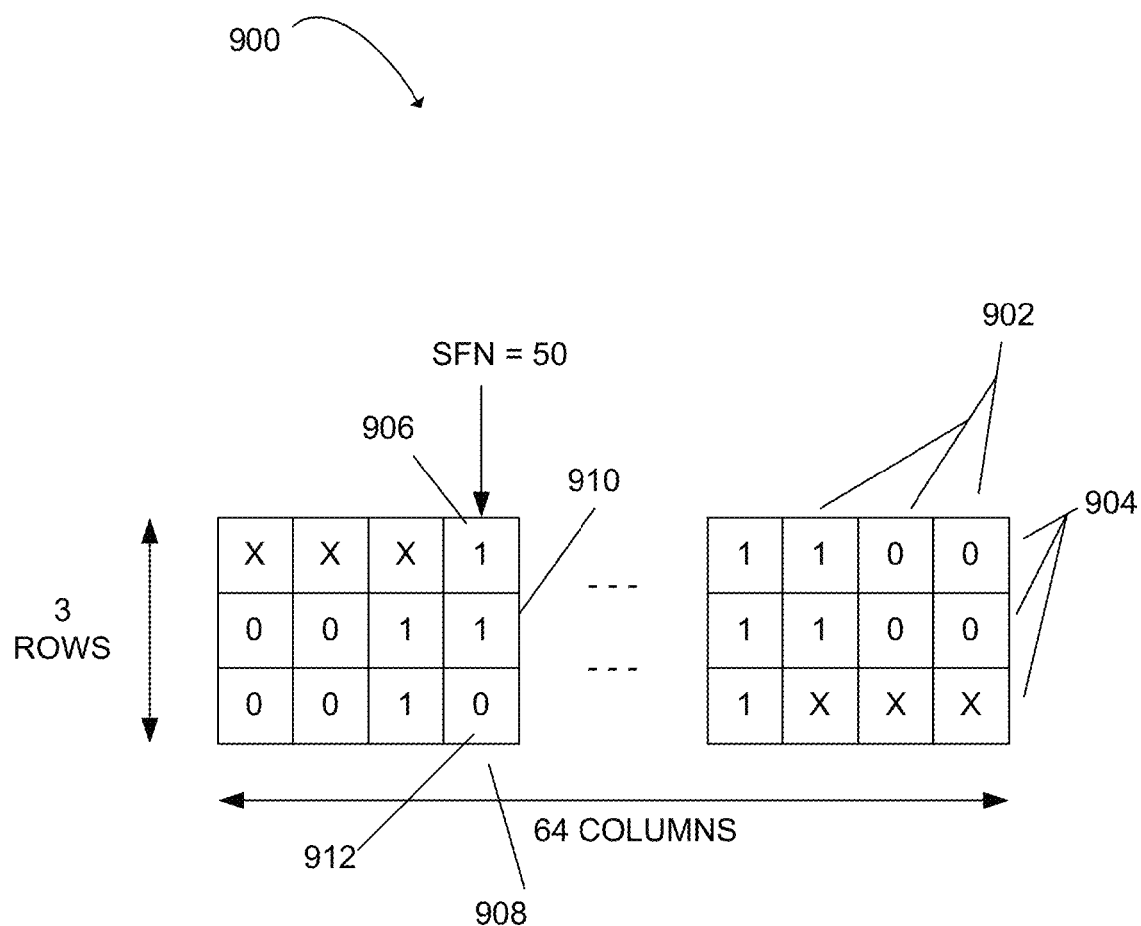
FIG. 9 shows an example of a muting pattern determination in accordance with an aspect of the present disclosure.

FIG. 9 shows an example of a muting pattern determination in accordance with an aspect of the present disclosure. An array 900 having 64 columns 902 and 3 rows 904 corresponds to $N_{Deep}=192$. The number 3 corresponds to how many times the entire muting sequence is searched. The number 64 is the maximum number of PRS occasions, in units of 160 ms, in a worst case scenario. The array is initialized with "don't care" values (represented by "Xs"). When the deep search is first started, which may be at system frame number (SFN)=50, the search may correspond to the first row 904 and fourth column 902, which is indicated as frame number 906. The deep search continues to work through the array 900 and mark each element of the array 900 with a "1" or other indicator corresponding to an ON state (the PRS signal is present) or "0" or other indicator corresponding to an OFF state (the PRS signal is not present). The entire span of 1024 radio frames is scanned three times (corresponding to the three rows 904). At the end, the three rows 904 are collapsed into one row of bits by taking the majority decision for each of the columns 902. For example, in column 908, which corresponds to the start of the search, the deep search detected an ON condition two times (in the first scan in element 906 and in the second scan in element 910) and an OFF condition once (in the third scan corresponding to element 912) so the final decision for SFN=50 will be '1' or ON. The final bit-string then determines the muting sequence and the PRS occasion period.

Figure 10:
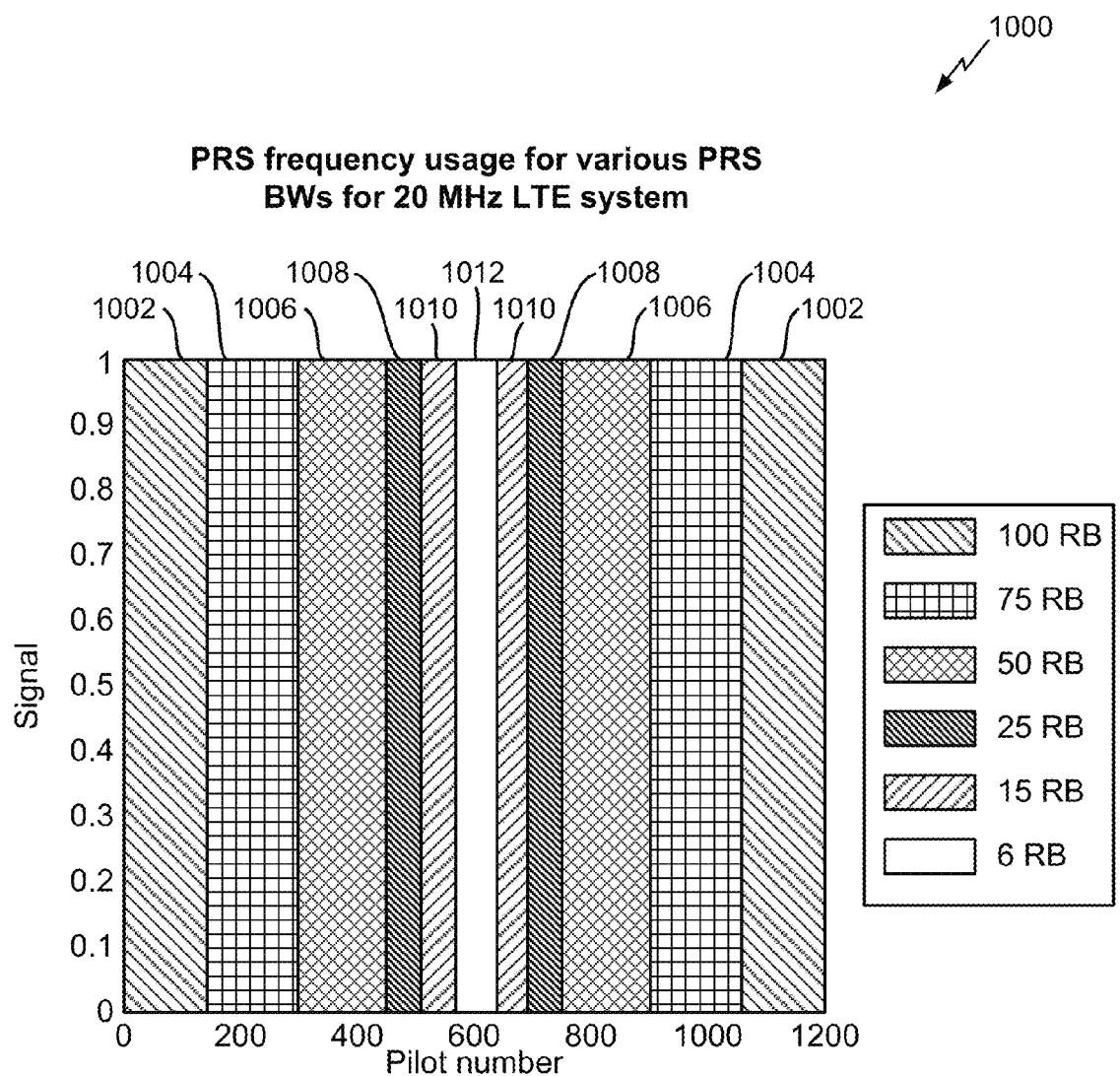
FIG. 10 illustrates a spectral chart for specific bandwidths of PRS tones in an aspect of the present disclosure.

FIG. 10 shows an illustration 1000 that indicates pilots that are associated with different system bandwidth options. A 20 MHz system bandwidth option has 100 RBs with 12 pilots each, and it uses the entire range of 1200 pilots in FIG. 10. One configuration for PRS detection successively searches for the PRS starting with the smallest PRS bandwidth hypothesis of 6 RBs, indicated by 1012 in FIG. 10. PRS detection may be based on S/S+N computation and thresholding. If PRS is detected for a lower bandwidth option, the algorithm would move to the next higher PRS bandwidth hypothesis until it includes the PRS bandwidth hypothesis that matches the system bandwidth.

Instead of using all RBs assigned to a higher PRS bandwidth for calculating S/S+N, the algorithm may use only the outer RBs that do not overlap with the immediately lower PRS bandwidth hypothesis. For example, the 3 MHz PRS hypothesis may be tested using only the outer 9 RBs (1010), and excluding the center 6 RBs (1012). If PRS bandwidth is 3 MHz or higher, the S/S+N of this PRS bandwidth hypothesis would be expected to be similar to that of the 1.4 MHz hypothesis. However, if the PRS bandwidth really was 1.4 MHz, then the S/S+N value of the 3 MHz PRS bandwidth hypothesis would be significantly lower than the 1.4 MHz hypothesis because the outer 9 RBs would contain noise or random data. Similarly, a 5 MHz PRS bandwidth hypothesis would use only the outer 10 RBs (1008) around 3 MHz; a 10 MHz hypothesis would use only the 25 outer RBs (1006) around 5 MHz; a 15 MHz hypothesis would use only the outer 25 RBs (1004) around 10 MHz; and a 20 MHz hypothesis would use only the 25 outer RBs (1002) around 15 MHz.

Hardware Implementation Example

Figure 11:
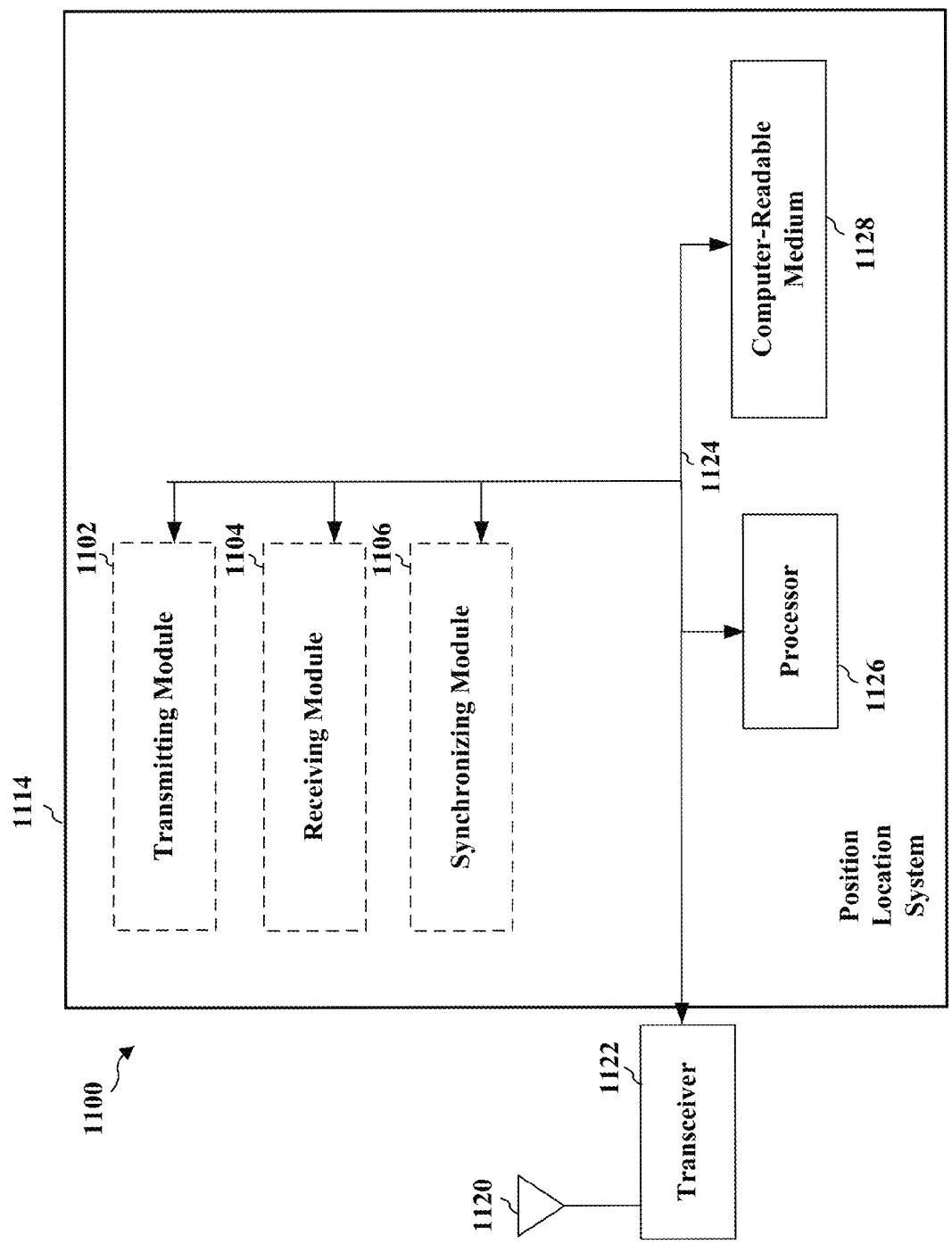
FIG. 11 is a block diagram illustrating an example of a hardware implementation for an apparatus employing a position location system.

FIG. 11 is a diagram illustrating an example of a hardware implementation for an apparatus 1100 employing a position location system 1114. The position location system 1114 may be implemented with a bus architecture, represented generally by a bus 1124. The bus 1124 may include any number of interconnecting buses and bridges depending on the specific application of the position location system 1114 and the overall design constraints. The bus 1124 links together various circuits including one or more processors and/or hardware modules, represented by a processor 1126, a transmitting module 1102, a receiving module 1104, a synchronizing module 1106 and a computer-readable medium 1128. The bus 1124 may also link various other circuits such as timing sources, peripherals, voltage regulators, and power management circuits, which are well known in the art, and therefore, will not be described any further.

The apparatus includes the position location system 1114 coupled to a transceiver 1122. The transceiver 1122 is coupled to one or more antennas 1120. The transceiver 1122 provides a way for communicating with various other apparatus over a transmission medium. The position location system 1114 includes the processor 1126 coupled to the computer-readable medium 1128. The processor 1126 is responsible for general processing, including the execution of software stored on the computer-readable medium 1128. The software, when executed by the processor 1126, causes the position location system 1114 to perform the various functions described supra for any particular apparatus. The computer-readable medium 1128 may also be used for storing data that is manipulated by the processor 1126 when executing software.

The transmitting module 1102, the receiving module 1104, and the synchronizing module 1106 may be software modules running in the processor 1126, resident/stored in the computer-readable medium 1128, one or more hardware modules coupled to the processor 1126, or some combination thereof. The position location system 1114 may be a component of the user equipment 250, and/or a component of the access point 210 and may include the memory 242, 272 and/or the controller/processor 240, 270.

In one configuration, an apparatus in accordance with the present disclosure includes means for estimating a PRS peak and/or S/S+N energy response in predetermined locations of each subframe of an incoming signal. In an aspect of the present disclosure, the estimating means may be the user equipment 250, the memory 272, the controller/processor 270, and/or the position location system 1114 of the apparatus 1100 configured to perform the functions recited by the estimating means. In this configuration, the apparatus also includes means for blindly detecting PRS parameters based at least in part on the estimated PRS peak energy responses. In an aspect of the present disclosure, the detecting means may be the user equipment 250, the memory 272, the controller/processor 270, and/or the position location system 1114 of the apparatus 1100 configured to perform the functions recited by the detecting means. In another aspect, the aforementioned means may be any module or any apparatus configured to perform the functions recited by the aforementioned means.

Flow Chart

Figure 12:
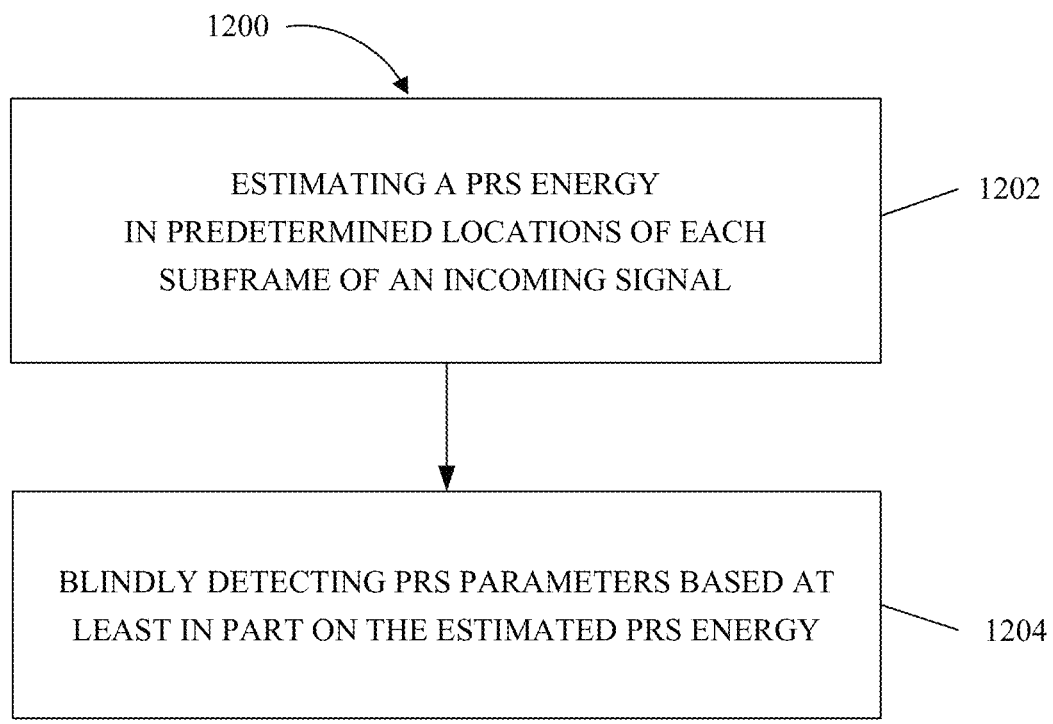
FIG. 12 is a flow chart illustrating a method in accordance with various aspects of the present disclosure.

FIG. 12 is a flow chart illustrating a method 1200 in accordance with an aspect of the present disclosure. In block 1202, a PRS energy is estimated in predetermined locations of each subframe of an incoming signal. In block 1204, PRS parameters are blindly detected based at least in part on the estimated PRS energy. The PRS energy may be a PRS peak energy response and/or S/S+N energy.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM memory, flash memory, ROM memory, EPROM memory, EEPROM memory, phase change memory (PCM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for determining a positioning reference signal (PRS) network configuration by a user equipment (UE), comprising:
    estimating a PRS energy from predetermined locations of each subframe of an incoming signal by observing, within a radio frame, a first subframe having a peak energy response above a threshold value; and
    blindly detecting PRS parameters based at least in part on the estimated PRS energy by:
        scanning the radio frame a plurality of times;
        determining presence of a PRS signal in each subframe of the radio frame based on the estimated PRS energy of each subframe being above the threshold value;
        assigning a value to each determined subframe based at least in part on a majority value of the plurality of scans; and
        determining the PRS parameters based on at least in part on a muting pattern, wherein the muting pattern is based at least in part on the assigned value for each subframe.

2. The method of claim 1, in which the PRS energy comprises a PRS peak energy response.

3. The method of claim 2, in which estimating the PRS peak energy response comprises observing peak energy responses across a plurality of frequency tones; and blindly detecting PRS parameters comprises determining a PRS bandwidth parameter based at least in part on the observations.

4. The method of claim 2, in which estimating the PRS peak energy response comprises: blindly detecting PRS parameters comprises determining a subframe offset parameter for a start of PRS occasions based at least in part on the observations.

5. The method of claim 1, in which the PRS energy comprises a PRS signal to signal plus noise ratio.

6. An apparatus for wireless communication, comprising: a receiver configured to receive signals from a plurality of locations; and at least one processor configured:
    to estimate a PRS energy from predetermined locations of each subframe of an incoming signal by observing, within a radio frame, a first subframe having a peak energy response above a threshold value; and
    to blindly detect PRS parameters based at least in part on the estimated energy by:
        scanning the radio frame a plurality of times;
        determining presence of a PRS signal in each subframe of the radio frame based on the estimated PRS energy of each subframe being above the threshold value;

assigning a value to each determined subframe based at least in part on a majority value of the plurality of scans; and determining the PRS parameters based on at least in part on a muting pattern, wherein the muting pattern is based at least in part on the assigned value for each subframe.

7. The apparatus of claim 6, in which the PRS energy comprises a PRS peak energy response.

8. The apparatus of claim 7, in which the at least one processor is further configured:
to observe peak energy responses across a plurality of frequency tones; and
to determine a PRS bandwidth parameter based at least in part on the observations.

9. The apparatus of claim 7, in which the at least one processor is further configured: to determine a subframe offset parameter for a start of PRS occasions based at least in part on the observations.

10. The apparatus of claim 6, in which the PRS energy comprises a PRS signal to signal plus noise ratio.

11. A computer program product comprising:
a non-transitory computer-readable medium having program code recorded thereon, the program code comprising:
program code to estimate a PRS energy from predetermined locations of each subframe of an incoming signal by observing, within a radio frame, a first subframe having a peak energy response above a threshold value; and
program code to blindly detect PRS parameters based at least in part on the estimated PRS energy by:
scanning the radio frame a plurality of times;
determining presence of a PRS signal in each subframe of the radio frame based on the estimated PRS energy of each subframe being above the threshold value;
assigning a value to each determined subframe based at least in part on a majority value of the plurality of scans; and
determining the PRS parameters based on at least in part on a muting pattern, wherein the muting pattern is based at least in part on the assigned value for each subframe.

12. The program product of claim 11, in which the PRS energy comprises a PRS peak energy response.

13. The program product of claim 11, in which the PRS energy comprises a PRS signal to signal plus noise ratio.

14. An apparatus for wireless communication, comprising:
means for estimating a PRS energy from predetermined locations of each subframe of an incoming signal by observing, within a radio frame, a first subframe having a peak energy response above a threshold value; and
means for blindly detecting PRS parameters based at least in part on the estimated PRS energy by:
scanning the radio frame a plurality of times;
determining presence of a PRS signal in each subframe of the radio frame based on the estimated PRS energy of each subframe being above the threshold value;
assigning a value to each determined subframe based at least in part on a majority value of the plurality of scans; and
determining the PRS parameters based on at least in part on a muting pattern, wherein the muting pattern is based at least in part on the assigned value for each subframe.

15. The apparatus of claim 14, in which the PRS energy comprises a PRS peak energy response.

16. The apparatus of claim 14, in which the PRS energy comprises a PRS signal to signal plus noise ratio.

* * * * *